(12) United States Patent
West et al.

(10) Patent No.: US 6,568,508 B2
(45) Date of Patent: May 27, 2003

(54) INTERNALLY LUBRICATED BALL SCREW AND NUT LINEAR ACTUATOR

(75) Inventors: Ryan B. West, Saginaw, MI (US); David A. Lange, Bay City, MI (US); John E. Kinney, Saginaw, MI (US)

(73) Assignee: Thomson Saginaw Ball Screw Company, L.L.C., Saginaw, MI (US)

( * ) Notice: Subject to any disclaimer, the term of this patent is extended or adjusted under 35 U.S.C. 154(b) by 50 days.

(21) Appl. No.: 09/876,407

(22) Filed: Jun. 7, 2001

(65) Prior Publication Data

US 2002/0185336 A1 Dec. 12, 2002

(51) Int. Cl.[7] .............................................. F16C 17/00
(52) U.S. Cl. ........................... 184/5; 74/467; 74/89.44
(58) Field of Search ..................... 184/5, 100; 74/467, 74/89.4, 89.43, 89.44

(56) References Cited

U.S. PATENT DOCUMENTS

| | | |
|---|---|---|
| 3,132,719 A | 5/1964 | Cole |
| 4,795,172 A * | 1/1989 | Brande ........................ 74/89.4 |
| 5,168,767 A | 12/1992 | Morita |
| 5,290,617 A * | 3/1994 | Mochizuki et al. .......... 184/100 |
| 5,399,023 A | 3/1995 | Winkelmann et al. |
| 5,454,278 A | 10/1995 | Kasuga |
| 5,570,958 A | 11/1996 | Tsukada |
| 5,694,811 A | 12/1997 | Tsukada |
| 5,749,266 A | 5/1998 | Tsukada |
| 5,809,838 A * | 9/1998 | Miyaguchi et al. ......... 74/89.44 |
| 5,906,136 A | 5/1999 | Yabe et al. |
| 6,023,991 A | 2/2000 | Yabe et al. |
| 6,125,968 A | 10/2000 | Shirai |
| 6,247,556 B1 * | 6/2001 | Chen ............................ 184/83 |

* cited by examiner

Primary Examiner—Chong H. Kim
(74) Attorney, Agent, or Firm—Reising, Ethington, Barnes, Kisselle, Learman & McCulloch, P.C.

(57) ABSTRACT

A ball screw and nut linear actuator incorporates an axially extending screw and a nut received on the screw to provide a helical raceway with recirculating load bearing balls. An axially extending member carried by the nut on a surface of the nut radially outboard of the raceway has ball return passages opening to the screws groove extending axially to span different turns of the screw groove. The ports lead to the ball return passages and are supplied with a liquid lubricant by a distributor system.

13 Claims, 3 Drawing Sheets

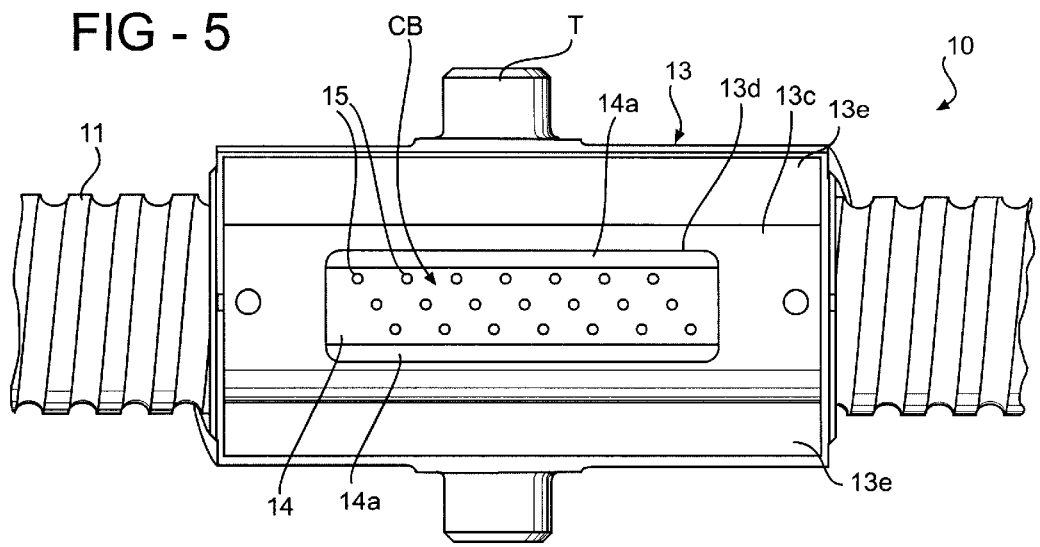
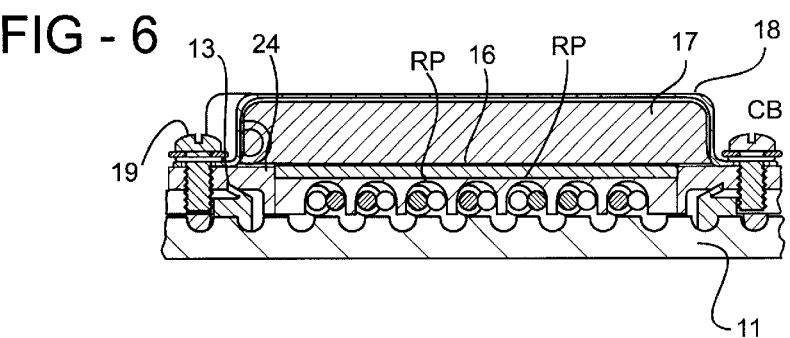
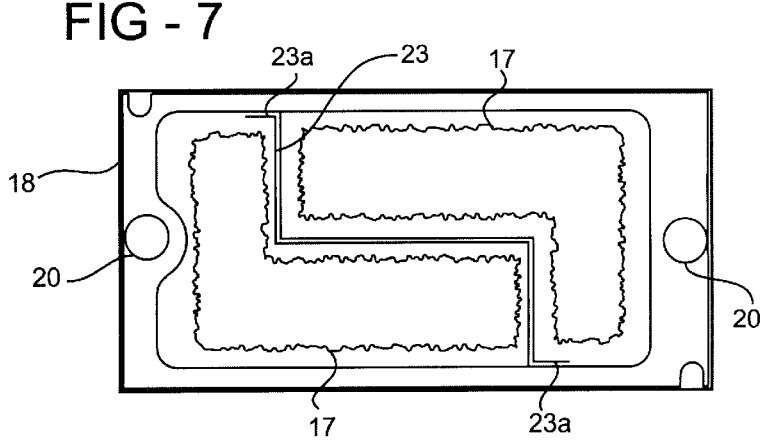

INTERNALLY LUBRICATED BALL SCREW AND NUT LINEAR ACTUATOR

This invention relates to internally lubricated, ball-recirculating ball screw and nut assemblies and is concerned with the actuator, the method of making the actuator, and the method of lubricating the actuator.

BACKGROUND OF THE INVENTION

The difficulty of providing lubrication to ball screw and nut assemblies in a manner to provide a continuous and consistent lubrication of the moving parts is well appreciated in the prior art. Such lubrication is particularly critical in industries such as the aircraft industry and others where poor and inadequate maintenance performed in the field might have a serious life-endangering consequence.

Various prior art structures have been suggested for internally lubricating linear actuators and some have provided a lubricant carrier in direct engagement with the screw in the manner of U.S. Pat. No. 6,125,968, which I incorporate herein by reference.

Other suggestions have involved the use of a molded lubricant-containing polymer member which is in direct contact with the recirculating balls traveling in the raceway of the ball screw and nut assembly, and I refer particularly to U.S. Pat. No. 6,023,991, which I also incorporate herein by reference.

In both of these assemblies the lubricant containing member is in direct engagement with moving parts of the assembly and a constant wear inevitably occurs which ultimately affects proper distribution of the lubricant.

SUMMARY OF THE INVENTION

The present invention is directed to a linear actuator wherein an axially extending portion of the nut has a series of ball return passages opening to the screw groove which span different turns of the screw groove. Ports are provided which extend to communicate with the ball return passages, and a lubricant distributor supplies lubricant to the ports.

In a preferred embodiment of the invention, the distributor may comprise a wicking lubricant carrier pad extending axially along the nut to span the ports and the pad may be in contact with a lubricant reservoir in the form of a foam pad housed in a reservoir cap carried on the nut.

One of the prime objects of the present invention is to provide a constant supply of clean oil to ports which meter separate flows at a constant rate through to the ball return passages.

Still another object of the invention is to, in this manner, avoid any contact of the lubricant carrier with moving parts.

Another object of the invention is to effectively lubricate the ball screw and nut assembly for extended periods to thereby increase lubrication service intervals.

Still another object of the invention is to provide a simpler and more economically manufactured linear actuator which eliminates a number of the parts needed to perform prior lubrication functions, and provides a product with a much more compact and streamlined footprint.

Still another object of the invention is to provide a linear actuator with a more durable and robust internal lubrication system using a minimum number of components which can be readily retrofitted to existing designs.

Still another object of the invention is to provide a linear actuator which has increased life expectancy by virtue of the continuous metered lubrication, and which is easily serviced in the field without dismantling it from the system being actuated.

Still a further object is to provide an internally lubricated ball screw and nut assembly which is tunable to the lubricant used.

Other objects and advantages of the invention will become apparent with reference to the accompanying drawings and the accompanying descriptive matter.

BRIEF DESCRIPTION OF THE DRAWINGS

The presently preferred embodiment of the invention is disclosed in the following description and in the accompanying drawings, wherein:

FIG. 5 is a top plan view of the ball nut and screw of FIG. 4 with certain of the components removed;

FIG. 6 is a top plan view of the reservoirs with the top of the reservoir cap broken away, illustrating the foam lubrication reservoir elements in place in the reservoir cap or casing; and FIG. 7 is a fragmentary sectional side elevational view of a slightly modified embodiment of the invention.

DETAILED DESCRIPTION OF THE PREFERRED EMBODIMENTS OF THE INVENTION

Figure 1:
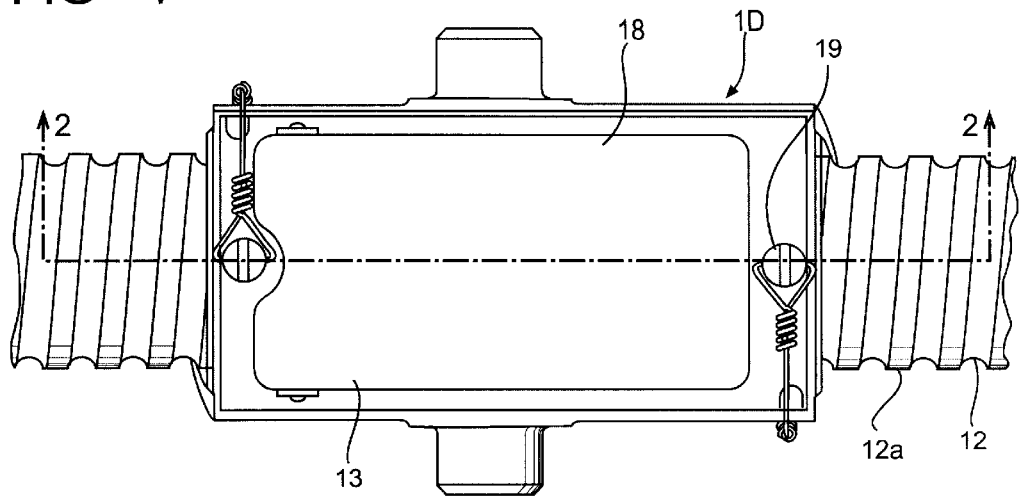
FIG. 1 is a top plan view of the ball screw and nut assembly.
Figure 2:
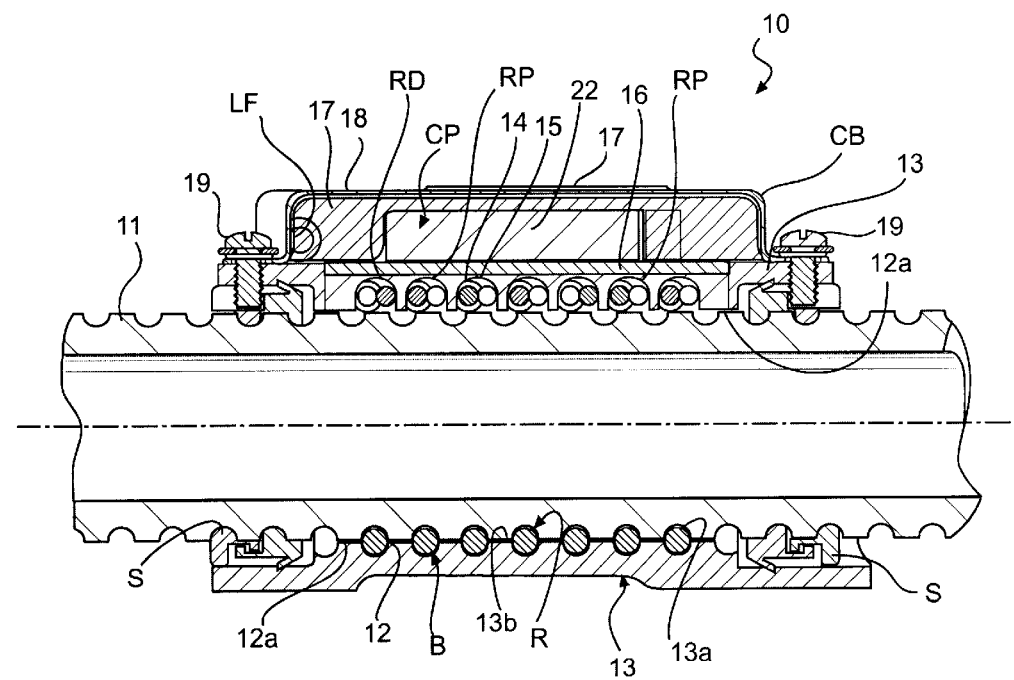
FIG. 2 is a sectional elevational view taken on the line 2—2 of FIG. 1 and along the line 2—2 of FIG. 6.
Figure 3:
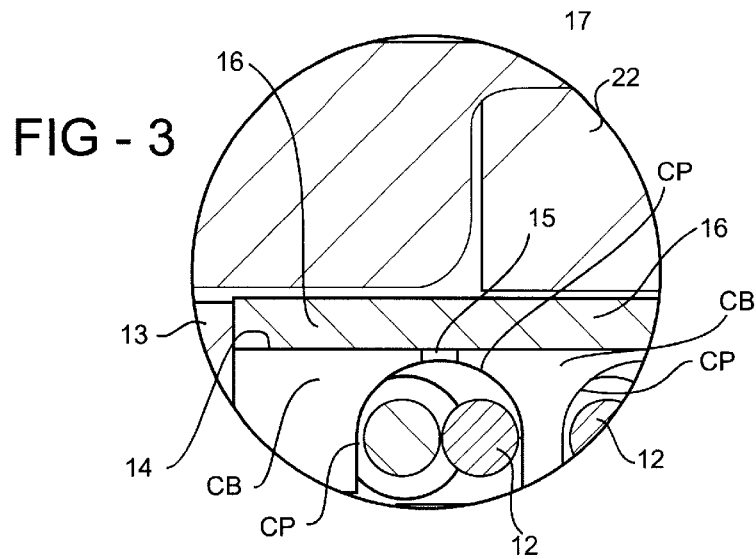
FIG. 3 is an enlarged cross sectional view of the circled portion CP of FIG. 2.

Turning now to the drawings and initially to FIGS. 1 and 2, a typical ball nut and screw assembly or actuator is shown generally at 10 and includes a typical elongate screw 11 having a helical groove 12 and helical land 12a. Mounted on the screw 12 is a ball nut 13, which is formed on its inner annular face, with a helical groove 13a and helical land 13b, which complement the screw groove 12 and land 12a, such that a ball accommodating raceway R is formed between them for accommodating a recirculating train of load bearing balls B in the usual manner. The nut may be fitted with seal assemblies S of the character disclosed in U.S. Pat. No. 4,905,533 and trunnions T.

Figure 4:
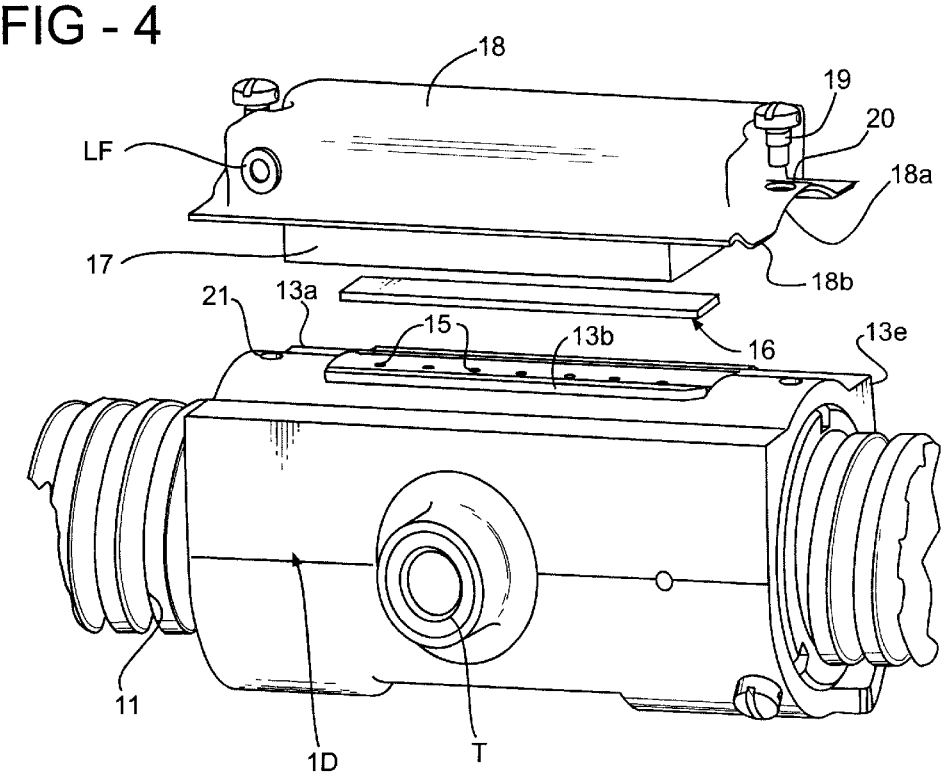
FIG. 4 is an exploded perspective view illustrating the various lubrication components.

As shown particularly in FIGS. 4 and 5, the upper central curvilinear surface 13c of the nut 13 has a slotted recess 13d for receiving a crossover block nut portion CB having a plurality of conventional axially angled, open-ended ball return passages RP which permit recirculation of the balls B on its radially inner surface. The block CB is axially recessed to provide side walls 14a and a floor 14. As shown in FIG. 2, a total of seven (but the number may vary) axially angled return passages RP are shown provided in the cross over block CB which functions as a portion of the nut 13 to transfer the recirculating trains of balls B between, in this embodiment of the invention, adjacent turns of the screw 11. The configuration of the ball return passages may be of the nature disclosed in U.S. Pat. Nos. 5,622,082, 5,937,700, and 6,112,610 which we incorporate herein by reference. The turnover passages RP are radially spaced from the radially outer floor surface 14 of the crossover block CB and this flatted recessed surface 14 is provided with a plurality of orifices or ports 15 of predetermined cross-sectional area communicating with each of the crossover passages RP.

Received within the recessed walls 14*a* on block CB is a liquid lubricant carrier or distributor in the form of a pad 16 which is saturated with absorbed oil or lubricant. The pad 16 may be a felt pad of the type made up of matted fibers of wool or the like worked into a compact material by rolling and pressure, or may be another suitable liquid oil absorptive device. It is contemplated that the pad 16 may be any distribution member which is capable of carrying liquid oil and releasing it or wicking it in a consistent and continuous manner over time to the ports 15. Typical felt pads are known as F 5 grade or F 50 grade packed tightly into place.

As FIG. 2 discloses, the recess in nut 11 is of such depth that oiler pad 16 substantially fills the recess and snugly fits into it. Provided above the pad 16 and in packed contact with it, is an oil reservoir, which may comprise a foam oil carrier 17, which is shown as provided in several segments housed within a metal casing or cap 18 constituting the reservoir cap. The foam pads 17 may be any suitable open celled synthetic plastic sponge which is chemically unharmed by the presence of the oil. For example, a polyurethane foam pad may be used. Casing 18 may be held in place by cap screws 19 extending through openings 20 into openings 21 provided in the nut 11 in a manner to pack the foam 17 into place against the pad 16.

As FIG. 4 discloses, the lower wall of the cap 18 is curvilinearly configured at its ends as at 18*a* to match the curvilinear portion 13*c* of the nut 13 and has flat side edges 18*b* which conform to the flat side edges 13*e* provided on the surface of the nut. Within casing 18, is a generally Z-shaped hold down bar 23 having ends 23*a* which secure to the interior wall of the casing or cap 18 and function to hold down crossover block CB as well as rigidify the cap 18. Because of bar 23, the foam member 17 is, in effect, made up of a pair of angle shaped elements, as shown in FIG. 6.

In a slightly modified embodiment of the invention, the bar 23 is omitted and the foam reservoir is a one-piece foam member. In this embodiment, the slot 13*b* extends completely through the nut body 13 and the crossover block can be inserted from the inside of the nut 13 to a position defined by undercut shoulders 24 which prevent radial outward movement of the cross block in this embodiment.

The Operation

While the invention contemplates the use of various liquid lubricants which are capable of being transferred to the ports 15, the preferred lubricant is a wickable oil lubricant which is absorbed into the open cell foam elements 17 in the manner of a sponge via lubrication fittings, such as shown at LF in FIG. 4, which lead into the interior of casing 18. A typical oil is the light instrument oil identified as military 7870 oil. Oil of a suitable consistency and viscosity is injected through fittings LF and absorbed by the spongelike foam element or elements 17, which is or are in operative contact or wicking engagement with the wicking pad 16. Fibrous wicking pad 16 is a transfer and distribution element which meters oil to passages or ports 15 leading to the crossover passages 14. While the ports 15 are shown as circular in configuration, they may be of other configuration. The crossover passages CP may be machined in the radially inner surface of the crossover block 13 or may comprise separate crossover components which are carried along the radially inner surface of the block 13.

Method of Construction

The lubrication system disclosed is readily adaptable to either existing installations or to new installations. It is merely necessary to machine the recess in the surface of the nut as illustrated and insert a crossover block which has been specially machined or fitted to provide crossover passages along its interior surface. Alternatively, the nut may be slotted to permit the cross block to be inserted from the interior of the nut. An oil impregnated wicking or oiler pad 16 can then be inserted in the cross block and a cap 18, with suitable foam reservoir members 17 then secured in place with suitable screws. By varying the diameter of the ports 15 and/or varying the density of the wicking pad 16, the system is tunable to the volume of oil needed.

The disclosed embodiments are representative of presently preferred forms of the invention, but are intended to be illustrative rather than definitive thereof. The invention is defined in the claims.

We claim:

1. A ball screw and nut linear actuator comprising:
   a. an axially extending screw having a helical groove with multiple turns bounded by a helical land;
   b. a nut having an axially extending helical groove and land received on said screw to provide a helical raceway formed by said screw and nut grooves;
   c. said raceway having recirculating load bearing balls;
   d. an axially extending member carried by said nut on a surface of said nut radially outboard of said raceway, said member having a series of ball return passages opening to said screw groove extending axially to span different turns of said screw groove, and ports extending to communicate with said ball return passages; and
   e. a liquid lubricant distributor system supplying lubricant to said ports.

2. The actuator of claim 1 wherein said system comprises a lubricant carrier extending axially on said nut along said member to span said ports.

3. The actuator of claim 2 wherein said system comprises a wicking pad radially outboard of said ports substantially in contact with said ports.

4. The actuator of claim 3 wherein said wicking pad is in communicating contact with a lubricant reservoir carried on said nut.

5. The actuator of claim 4 wherein said reservoir comprises a lubricant absorbing sponge in the form of a foam pad housed in a reservoir cap carried on said nut.

6. The actuator of claim 5 wherein said member, wicking pad, and reservoir are in radial engagement.

7. A ball screw and nut linear actuator comprising:
   a. an axially extending screw having a helical groove with multiple turns bounded by a helical land;
   b. a nut having an axially extending helical groove and land received on said screw to provide a helical raceway formed by said screw and nut grooves;
   c. said raceway having recirculating load bearing balls;
   d. an axially extending cross block carried by said nut on a surface of said nut radially outboard of said raceway, said cross block having a series of ball return passages along its radially inner face opening to said screw groove and extending axially to span adjacent turns of said screw groove, said cross block being axially recessed radially outboard of said inner face to provide a radially inset liquid lubricant distributing face having ports extending to communicate with said ball return passages;
   e. a wicking pad received in said cross block recess in contact with said pads for supplying wickable lubricant to said ports; and f. a foam sponge reservoir carried on said nut in operative contact with said wicking pad for supplying said lubricant thereto.

8. A method of constructing a ball screw and nut linear actuator comprising:
   a. providing an axially extending screw having a helical groove bounded by a helical land;
   b. providing a nut with an axially extending mating helical groove and land on said screw to provide a helical raceway;
   c. providing recirculating load bearing balls in said raceway;
   d. providing said nut with an axially extending portion having ball return passages extending axially to span different turns of said groove to pass said balls from one of said different turns to another of said different turns and with generally radial ports extending in said portion to communicate with said passages; and
   e. providing a liquid distributor system for supplying lubricant to said ports.

9. The method of claim 8 comprising providing said system as a wicking pad extending along said ports.

10. The method of claim 9 comprising providing a foam sponge in radial contact with said wicking pad as a lubricant reservoir.

11. The method of claim 7 wherein said ball return passages span adjacent turns of said groove.

12. A method of lubricating a ball screw and nut linear actuator comprising:
   a. an axially extending screw having a helical groove bounded by a helical land;
   b. a nut with an axially extending mating helical groove and land on said screw to provide a helical raceway;
   c. recirculating load bearing balls in said raceway;
   d. said nut having an axially extending portion with ball return passages extending axially to span different turns of said groove to pass said balls from one of said different turns to another of said different turns, and with generally radial ports extending in said portion to communicate with said passages; and
   e. a lubricant reservoir carried by said nut, the method comprising providing a liquid wicking pad extending along said ports and continuously wicking lubricant to said ports from said reservoir.

13. The method of claim 8 comprising providing said reservoir as a foam sponge in radial contact with said wicking pad.

* * * * *